April 14, 1970     J. J. TAPSCOTT     3,506,021
DISCHARGE APPARATUS FOR PROCESSING EQUIPMENT
Filed Oct. 10, 1966     2 Sheets-Sheet 1
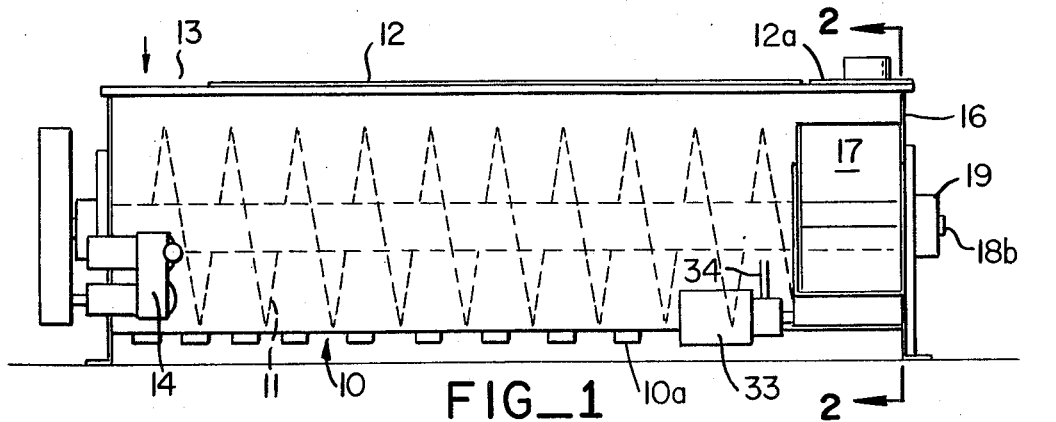
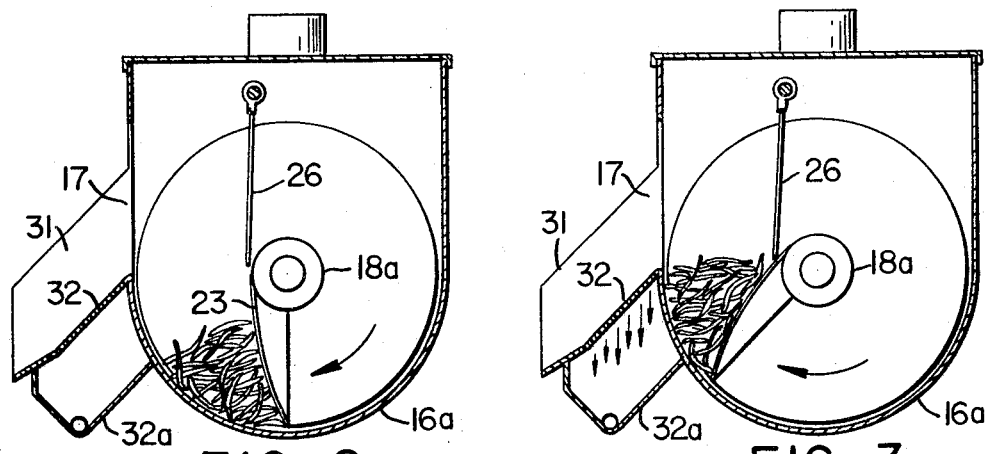
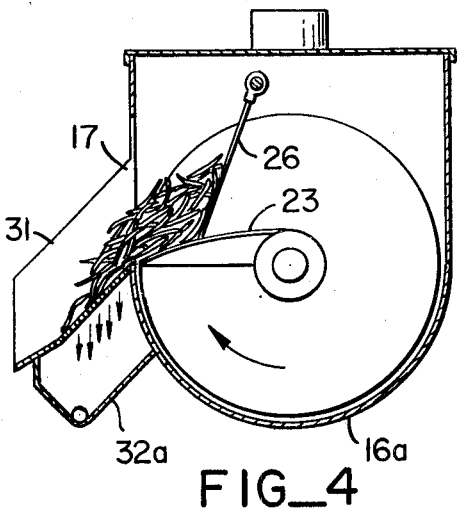
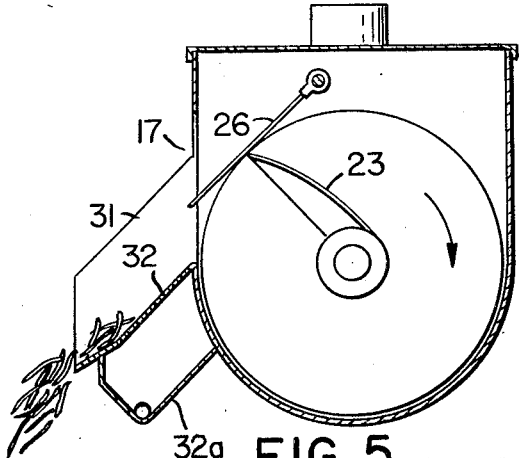
INVENTOR.
JESSE J. TAPSCOTT
BY
ATTORNEYS April 14, 1970     J. J. TAPSCOTT     3,506,021
DISCHARGE APPARATUS FOR PROCESSING EQUIPMENT
Filed Oct. 10, 1966     2 Sheets-Sheet 2
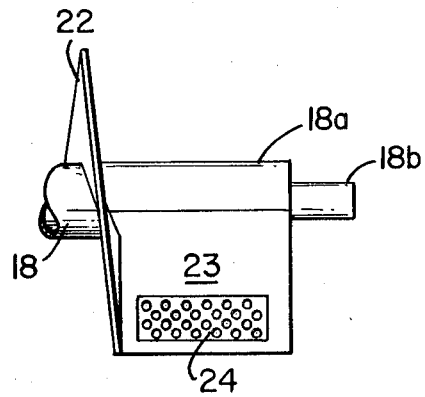
FIG_6
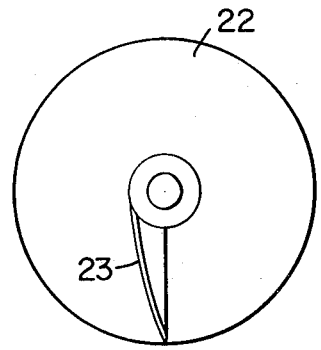
FIG_7
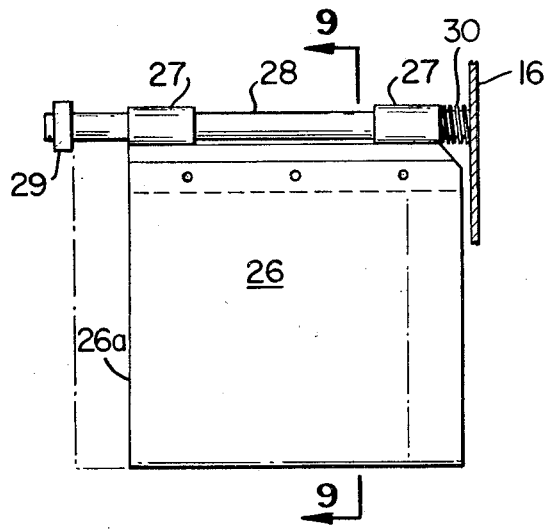
FIG_8
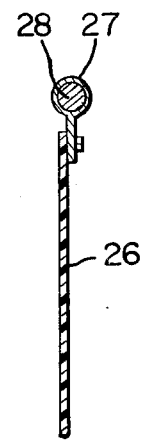
FIG_9
INVENTOR.
JESSE J. TAPSCOTT
BY
ATTORNEYS

United States Patent Office 3,506,021
Patented Apr. 14, 1970

3,506,021
DISCHARGE APPARATUS FOR PROCESSING EQUIPMENT
Jesse J. Tapscott, Santa Rosa, Calif., assignor to Rietz Manufacturing Co., Santa Rosa, Calif., a corporation of California
Filed Oct. 10, 1966, Ser. No. 585,447
Int. Cl. B08b 3/00; B65g 33/14
U.S. Cl. 134—104                                                1 Claim

---

ABSTRACT OF THE DISCLOSURE

A liquid treatment trough-like housing with a feedscrew for advancing solid material to be treated through said housing and a pusher member cooperating with a discharge paddle on the end of said feedscrew to effect positive dislodgement and discharge of solid material through an outlet opening in the side of said housing.

---

This invention relates generally to apparatus for effecting positive discharge of solid material from various processing or treatment equipment. It is particularly applicable in conjunction with processing equipment of the type in which a feedscrew advances solid material through a trough-like housing to a region where the solid material is to be discharged.

Equipment of the type described above is applicable to various processing operations such as the washing, blanching, cooking or chilling of various food materials. In the past it has been common to provide one end of the feedscrew with a paddle which rotates with the discharge end of the housing. The material being processed is continuously delivered to the discharge end of the housing where it is displaced by the paddle and delivered through a side discharge opening. It has been found that this type of discharge arrangement is not satisfactory for certain types of materials, such as elongated or stringy materials like string beans, due presumably to the tendency of such material to interlace. Also such arrangements may cause an excessive amount of the processing water to be discharged with the solid material.

It is an object of the present invention to provide discharge apparatus for processing equipment which is applicable to a wide variety of materials, including materials like string beans that are elongated or stringy.

Another object of the invention is to provide discharge apparatus of the above character which is constructed in such a manner as to avoid delivery of excess processing liquid together with the solid material.

Another object of the invention is to provide improved discharge apparatus which is relatively simple in its construction and operation.

Additional objects and features of the invention will appear from the following description in which the preferred embodiment has been set forth in detail in conjunction with the accompanying drawing.

Referring to the drawing:

FIGURE 1 is a side elevational view of processing equipment incorporating the present invention;

FIGURE 2 is a cross-sectional view taken along the line 2—2 of FIGURE 1;

FIGURES 3, 4 and 5 are likewise cross-sectional views like FIGURE 2 but showing different operating positions;

FIGURE 6 is a side elevational view of one end of the feedscrew showing the manner in which the paddle is incorporated;

FIGURE 7 is a view looking toward the right hand end of FIGURE 6;

FIGURE 8 is a front view of the pusher member, showing the manner in which it is suspended; and FIGURE 9 is a cross-section taken on the line 9—9 of FIGURE 8.

In general, my invention employs a paddle mounted at the discharge end of the feedscrew and having a radial dimension which is the same or comparable to the radial dimension of the feedscrew flight. The paddle is disposed within a chamber that is an extension of the feedscrew housing. This chamber has a lower arcuate wall portion over which the paddle sweeps to displace the solid material and cause it to be discharged through a side outlet opening. Pusher means is provided to cooperate with the paddle whereby for each rotation of the paddle its advancing face is swept by the pusher means to positively expel solid material through the outlet opening.

FIGURE 1 shows apparatus consisting of a housing 10 for the feedscrew 11. The housing is trough-like in form, with a top cover 12 and an upper inlet or feed opening 13. The feedscrew is driven by suitable means such as the variable speed electric motor drive 14. At the discharge end of the housing, i.e., the right hand end in FIGURE 1, there is a housing extension 16 forming a discharge chamber. The lower arcuate wall 16a of this chamber is co-extensive with the lower curved wall of the housing 10. One side of this chamber is provided with the outlet opening 17 through which the solid material is discharged. It is also provided with the removable cover plate 12a which is adjacent to the cover plate 12 for the housing 10.

FIGURES 6–7 illustrate the parts secured to the feedscrew and which are disposed in the chamber 16. Thus the shaft 18 of the feedscrew has an extension 18a and a portion 18b of reduced diameter that is journalled in the bearing 19. The rigid paddle 23 is attached to the shaft extension 18a and to the adjacent end of flight 22. It is dimensioned whereby its radial length from the axis of the shaft 18 is substantially equal to the radial dimensioning of the flight 22. It will be noted that the paddle 23 is somewhat curved, thereby presenting a convex advancing face. At its point of attachment to the shaft extension 18a, the advancing face of the paddle is substantially tangent to the periphery of the shaft. A portion of the solid wall of this paddle is cut away and this space is occupied by a perforated plate 24.

A pusher member 26 cooperates with the paddle 23 to effect positive dislodgement and discharge of solid material through the opening 17. As shown in FIGURES 2, 8 and 9, the pusher member 26 is in the form of a substantially flat sheet or plate which is pivotally supported in a region generally above the axis of the feedscrew. While various materials can be used for this pusher member, I have obtained good results with plastic laminate. The upper end of the member 26 is shown pivotally suspended by fitting 27 which loosely engages the horizontal rod 28. One end of this rod may be attached to the end wall of the housing extension 16 and the other end to a suitable crossbar 29. A coil spring 30 is disposed adjacent the end wall of the housing extension 16. This spring is dimensioned to yieldably urge the pusher member toward the left as viewed in FIGURE 8 whereby its edge 26a is urged into contact with the flight 22 during a discharge cycle. As illustrated in FIGURE 2, the pusher member is substantially vertical with its lower edge in contact with the feedscrew shaft extension 18a. Also the pivotal axis of the pusher member is at a radial distance from the axis of the feedscrew that is substantially greater than the radial dimensions of the paddle 23.

In addition to the parts described above, means are provided for receiving the solid material as it is delivered through the outlet opening 17. Thus a discharge chute 31 is attached to the side of the housing extension 16 and is disposed to receive the solid material delivered through opening 17. The lower wall 32 of this chute is perforated or formed by a screen 32, where liquid drains through the same. The liquid so removed is collected in the lower reservoir 32a which may connect with suitable means for returning the liquid to the process. Thus in FIGURE 1 I have shown a motor driven pump 33 having its suction side connected to the reservoir 32a and having its discharge line 34 serving to return the liquid to the process or to portions of the main housing 10.

As is known to those familiar with feedscrew equipment used in the processing of food products, the processing while the material is in transit frequently involves subjecting the material to an elevated temperature in contact with water, whereby the material is blanched, sterilized or cooked. Thus the housing may be provided with provision for introducing steam through means 10a to effect heating, and the shaft and flight of the screw may be hollow and arranged to receive steam to effect heat transfer from the surface of the flights to the material being processed. Irrespective of the particular processing operations involved, the solid material is fed continuously through the inlet opening 13, while the feedscrew is in operation. At the discharge end of the feedscrew the material is supplied continuously to the interior of the housing extension 16. The paddle 23 revolves within the chamber formed by the housing extension, and its forward face serves to dislodge material in a direction toward the outlet opening 17. When the paddle is in the position shown in FIGURE 2, the pusher 26 hangs substantially vertical, and edge 26a is urged into contact with the advancing face of flight 22, by spring 30. However, as the paddle approaches the 45° position shown in FIGURE 3, its lower edge engages the advancing face of the paddle and slides outwardly over the face of the paddle. When the paddle reaches the position shown in FIGURE 3, the pusher 26 has been caused to move a substantial distance over the advancing face of the paddle, and this has positively pushed some of the material from the face of the paddle and through the outlet opening 17. When the paddle reaches the position shown in FIGURE 5, the pusher member has swept completely across the advancing face of the paddle and therefore has dislodged all of the material through the outlet opening 17. When the paddle moves from the position of FIGURE 5 to a vertical position, the pusher member returns to the normal position shown in FIGURE 2 under the urge of gravity. Also it returns to the position indicated by dotted lines in FIGURE 8.

The complete discharge cycle described above occurs during rotation of the feedscrew and paddle 23 through 180°. For about 90° of rotation of the feedscrew preceding the discharge cycle, the edge 26a of the pusher 26 is yieldably urged against the flight 22. Thus for this 90° rotation, the pusher member moves in the general direction of its plane against the spring 30 until it reaches the position shown in solid lines in FIGURE 8. The amount of such movement is substantially one-fourth the flight pitch.

It will be evident from the foregoing that I have provided discharge apparatus which is relatively simple in construction and operation, but which serves effectively to dislodge solids being delivered from the discharge end of the feedscrew. The apparatus is capable of handling a wide variety of materials, including solid materials which are stringy in form, such as string beans. Excess processing water is not delivered through the discharge opening together with the solid material, because a substantial amount of this water passes through the perforated wall portion 24.

My discharge apparatus is also of such a character that it can be readily incorporated in processing equipment of the type utilizing a rotary feedscrew such as the processing equipment described with reference to FIGURE 1. When used with such equipment, it has been found that the interior length of the housing extension 16 should be at least one and one-half times the pitch of the feedscrew flight. This provides adequate space for receiving the solid material. The paddle 23 and also the pusher 26 should have a width slightly less than the length of the chamber formed by housing extension 16.

I claim:
1. In apparatus for the processing of solid products, a trough-like housing, a rotatable feedscrew disposed within the housing and having a helicoidal flight serving to move solid material from a feed end of the housing toward the discharge end, a housing extension forming a chamber at the discharge end of the feedscrew, a paddle secured to the feedscrew at the discharge end of the flight and rotatable therewith, the paddle extending generally parallel to the axis of the feedscrew and having one edge of the same joined to the adjacent end of the flight, the chamber having an arcuate lower wall portion over which the paddle is disposed to sweep to discharge solid material in advance of the same, one side of said chamber being provided with an outlet opening for the discharge of solid material, a depending pusher member having its lower end disposed to engage and displace solid material from the advancing face of the paddle and toward the outlet opening, means for pivotally supporting the upper end of the pusher member on an axis above the axis of the feed screw and substantially parallel thereto, the lower end of said pusher member being adapted to engage and slide across the advancing face of the paddle member as the paddle is rotated together with the feed screw, said pivotal supporting means permitting limited movement of the pusher member in the direction of said pivotal axis, and spring means for yieldably urging the pusher member toward the adjacent end portion of the helicoidal flight, whereby one radially extending edge of the pusher member wipes across the adjacent end portion of the helicoidal flight.

References Cited
UNITED STATES PATENTS

| | | | |
|---|---|---|---|
| 972,761 | 10/1910 | Gauntt | 198—213 XR |
| 1,859,586 | 5/1932 | Gottschall et al. | 198—213 |
| 1,977,312 | 10/1934 | Knapp | 198—213 |
| Re. 23,887 | 10/1954 | Balluteen | 134—132 XR |
| 1,363,053 | 12/1920 | Pierson et al. | 134—132 XR |
| 1,826,015 | 10/1931 | Morton | 134—104 XR |
| 3,297,043 | 1/1967 | Adams | 134—65 XR |

ROBERT L. BLEUTGEN, Primary Examiner

U.S. Cl. X.R.
134—132; 198—213